United States Patent
Katsumata et al.

(10) Patent No.: US 8,646,402 B2
(45) Date of Patent: Feb. 11, 2014

(54) INDICATOR HAVING ROTARY MEMBERS TO HOLD GUIDE RAIL

(75) Inventors: Yasuhiro Katsumata, Shimada (JP); Tomohiro Sugiyama, Shimada (JP); Masaaki Sano, Shimada (JP)

(73) Assignee: Yazaki Corporation, Tokyo (JP)

( * ) Notice: Subject to any disclaimer, the term of this patent is extended or adjusted under 35 U.S.C. 154(b) by 375 days.

(21) Appl. No.: 13/122,195

(22) PCT Filed: Oct. 2, 2009

(86) PCT No.: PCT/JP2009/067278
§ 371 (c)(1),
(2), (4) Date: Apr. 1, 2011

(87) PCT Pub. No.: WO2010/038878
PCT Pub. Date: Apr. 8, 2010

(65) Prior Publication Data
US 2011/0179991 A1    Jul. 28, 2011

(30) Foreign Application Priority Data

Oct. 3, 2008  (JP) ................................. 2008-258708
Sep. 30, 2009  (JP) ................................. 2009-228302

(51) Int. Cl.
*G01D 13/22*  (2006.01)
*G12B 11/04*  (2006.01)

(52) U.S. Cl.
USPC ........................ 116/328; 116/284; 116/DIG. 6

(58) Field of Classification Search
USPC ............ 116/278, 281–290, 294, 305, DIG. 6, 116/DIG. 36, 62.1, 62.4, 327, 328, 332; 340/815.78
See application file for complete search history.

(56) References Cited

U.S. PATENT DOCUMENTS

| 2007/0194901 | A1 |   | 8/2007  | Ziegler et al. |         |
|--------------|----|---|---------|----------------|---------|
| 2010/0251954 | A1 | * | 10/2010 | Yamada         | 116/201 |
| 2013/0055947 | A1 | * | 3/2013  | Katsumata      | 116/305 |

FOREIGN PATENT DOCUMENTS

| FR | 2790552 A1 * | 9/2000  | ............. G01D 13/22 |
|----|--------------|---------|--------------------------|
| JP | 33-19952 Y1  | 12/1958 |                          |

(Continued)

OTHER PUBLICATIONS

International Search Report for PCT/JP2009/067278 dated Oct. 27, 2009 [PCT/ISA/210].

*Primary Examiner* — Richard A. Smith
(74) *Attorney, Agent, or Firm* — Sughrue Mion, PLLC

(57) ABSTRACT

There is provided an indicator in which a moving member 9 on which a pointer 21 is installed is caused to run on a guide rail 1 formed along a scale formed on a dial, characterized in that the moving member 9 comprises a first support member 11 for pivotally supporting a plurality of pulleys 17 which are arranged along the guide rail 1 and a second support member 13 for pivotally supporting at least a pulley 17, and in that the plurality of pulleys 17 pivotally supported on the first support member 11 and the pulley 17 pivotally supported on the second support member 13 hold the guide rail 1 therebetween and the first support member 11 and the second support member 13 are assembled to each other so as to slide in an inter-axis direction of the plurality of pulleys 17 which are pivotally supported on the first support member 11 and the pulley 17 which is pivotally supported on the second support member 13, the indicator having further a spring member 15 for biasing the first support member 11 and the second support member 13 in a direction to reduce an inter-axis space therebetween.

6 Claims, 12 Drawing Sheets

(56) References Cited

FOREIGN PATENT DOCUMENTS

| JP | 55060862 A | * | 5/1980 | ............ | G01R 17/06 |
| JP | 09-279931 A | | 10/1997 | | |
| JP | 2006-527360 A | | 11/2006 | | |
| JP | 2008-128948 A | | 6/2008 | | |
| JP | 2008256489 A | * | 10/2008 | ............ | G01D 13/22 |
| JP | 2009-2716 A | | 1/2009 | | |
| JP | 2011232234 A | * | 11/2011 | ............ | G01D 13/22 |
| JP | 2011257373 A | * | 12/2011 | ............ | G01D 13/22 |
| JP | 2012122904 A | * | 6/2012 | ............ | G01D 13/22 |
| JP | 2012137317 A | * | 7/2012 | ............ | G01D 13/22 |

* cited by examiner (a) (b)

(a) (b)

INDICATOR HAVING ROTARY MEMBERS TO HOLD GUIDE RAIL

TECHNICAL FIELD

The present invention relates to an indicator and more particularly to an indicator in which a pointer is caused to move along a scale.

BACKGROUND ART

Conventionally, installed on an indicator installed in a motor vehicle, for example, are a scale provided in an arc and a pointer which rotates along the scale about a rotational shaft provided substantially in a center of the arc. In this case, a portion lying inside the scale is a rotating area of the pointer, and a rotating section for the pointer is disposed on a back side of the scale. Therefore, it has been difficult to provide another indication means in the portion.

Then, Patent Document 1 proposes an indicator (hereinafter, referred to as a centerless meter) in which a pointer is supported on a guide rail formed along a scale so as to be allowed to move along the guide rail to a predetermined mark on the graduated scale and an indication device such as a liquid crystal indicator is provided in an area lying inside the scale. In the centerless meter of Patent Document 1, many gears, which are arranged so as to mesh with adjacent gears, are supported within the guide rail having a U-shaped section and formed in an arc along the scale. Then, a rack, which meshes with the gears, is installed on a pointer main body, which includes the pointer and an installation portion, via a spring, and the gears are rotated by a motor so as to move the pointer to indicate a predetermined mark on the graduated scale. In addition, the patent document describes that rotary members such as pulleys are installed to ends of the installation portion in the moving direction of the pointer, so that the pointer main body is allowed to move along the scale smoothly by causing the rotary members to rotate while bringing them to sliding contact with inner walls of the guide rail.

RELATED ART DOCUMENT

Patent Document

Patent Document 1: JP-A-2008-128948

SUMMARY OF THE INVENTION

Problem that the Invention is to Solve

However, in the centerless meter of Patent Document 1, since many gears are supported within the guide rail and the pointer is supported on the guide rail by causing the gears to mesh with the rack, the configurations of the centerless meter becomes complex.

Then, as a centerless meter having a simplified configuration, an indicator is considered in which a guide rail is provided along a scale, a plurality of rotary members are supported pivotally on a moving member on which a pointer is installed, and the pointer is supported on the guide rail so as to run thereon by causing the rotary member to hold the guide rail therebetween. According to this indicator, since the pointer can be supported on the guide rail by holding the guide rail by the rotary members therebetween, the configuration of the indicator can be simplified.

However, when the guide rail is held by the rotary members, although an inter-axis space between the rotary members needs to match a size of the guide rail, there may occur a situation in which the inter-axis space of the rotary members or the size of the guide rail varies due to production tolerance, leading to a problem that the pointer is not allowed to move along the scale stably.

A problem that the invention is to solve is to simplify the configuration of an indicator and to enable the pointer to move stably.

Means for Solving the Problem

With a view to solving the problem, according to the invention, there is provided an indicator having a guide rail formed along a scale formed on a dial, a moving member supported on the guide rail so as to run, a pointer installed on the moving member to indicate a mark on the scale and a driving device for imparting a driving force to the moving member, wherein the moving member comprises a first support member for pivotally supporting a plurality of rotary members which are arranged along the guide rail and a second support member for pivotally supporting at least one rotary member, and the plurality of rotary members pivotally supported on the first support member and the rotary member pivotally supported on the second support member are made to hold the guide rail therebetween and the first support member and the second support member are assembled to each other so as to slide in an inter-axis direction of the plurality of rotary members which are pivotally supported on the first support member and the rotary member which is pivotally supported on the second support member, the indicator further has an elastic member for biasing the first support member and the second support member in a direction to reduce an inter-axis space therebetween.

Namely, since the rotary members can be supported pivotally on the moving member on which the pointer is installed and the pointer can be supported on the guide rail by holding therebetween the guide rail by the rotary members, the configuration of the indicator can be simplified. Further, since the first support member and the second support member on both of which the rotary members are installed are assembled so as to slide in the inter-axis direction of the rotary members and the rotary members are pressed against the guide rail by the elastic member so as to hold the guide rail therebetween, the inter-axis space of the rotary members can be adjusted so as to match the dimension or track configuration of the guide rail, whereby the pointer is allowed to run stably.

In this case, a groove can be formed in a surface of each rotary member which holds the guide rail into which the guide rail can be inserted. In addition, a groove can be formed in portions of the guide rail which are held by the rotary members into which edge portions of the rotary members are inserted.

In addition, since when the inter-axis space between the rotary members expands so largely as to exceed a predetermined range, the rotary members are derailed from the guide rail, the derailment of the rotary members can be prevented by restricting the expansion of the inter-axis space within the predetermined range.

Incidentally, when a groove is formed in the surfaces of each rotary member which hold the guide rail so that the guide rail can be inserted therein, for example, the guide rail is formed into a shape like a plate having a rectangular section, both surfaces of shorter sides of the guide rail are made to function as running surfaces for the rotary members, and a projecting portion is formed on the running surfaces so as to extend along a direction in which the guide rail extends. Then, a groove can be formed in an outer circumferential surface of each rotary member so as to straddle the corresponding projecting portion so that the projecting portion can be inserted therein.

According to this configuration, since the projecting portions and the groove of each rotary member can mesh with each other so that an axial position of the rotary member can be restrained from being offset in a widthwise direction of the guide rail, the rotary member is allowed to run on the running surface of the guide rail, thereby making it possible to allow the pointer to run stably.

However, in consideration of production tolerances, since a gap is formed between the projecting portion and an inner surface of the groove, for example, in case an external force is exerted in an axial direction of the rotary member, the rotary member is offset in the direction of the external force by an amount equal to the gap, whereby the moving member on which the pointer is installed is caused to run along a zigzag course. As a result of this, the pointer is caused to move towards or away from the scale, leading to a problem that the appearance of the indicator is deteriorated.

With a view to solving this problem, it is preferable that a projecting portion is formed on running surfaces of a guide rail on which each rotary member runs so as to extend in a running direction of the rotary member, a groove is formed in an outer circumferential surface of each rotary member to a depth which is deeper than a height of the projecting portion and so as to straddle the projecting portion, and sloping surfaces are formed on the running surface so as to slope downwards towards edges of the guide rail in the widthwise direction thereof so that each rotary member is brought into contact with the guide rail on the sloping surfaces.

According to this configuration, when the axial position of the rotary member is offset in the widthwise direction of the guide rail, a distal end of one of groove walls of the rotary member climbs up the sloping surface, whereas the other groove wall departs from the sloping surface. As this occurs, since a component force is generated along the sloping surfaces by a spring back force of the elastic member which is exerted on the rotary member, the axial position of the rotary member is returned by this component force. Consequently, the zigzag running of the rotary member can be restrained, thereby making it possible to allow the pointer to run stably. Note that an axial section of the rotary member can be formed into a rectangular or triangular shape.

In addition, as the other method for restraining the zigzag running of the moving member, a sloping surfaces is formed on inner surfaces of the groove walls of each rotary member. Namely, a projecting portion is formed on running surfaces of a guide rail on which each rotary member runs so as to extend in a running direction of the rotary member, a groove is formed in an outer circumferential surface of each rotary member so as to straddle the projecting portion, and a sloping surface is formed on inner surfaces of both groove walls of the groove so as to flare out towards the guide rail so that each rotary member is brought into contact with the guide rail on the sloping surfaces.

According to this configuration, when the axial position of the rotary member is offset in the widthwise direction of the guide rail, the rotary member is lifted up along the sloping surface of one of the sloping surfaces of the rotary member, whereas the sloping surface of the other groove wall departs from the running surface of the guide rail. As a result of this, the axial position of the rotary member is returned by a component force produced at a contact portion between the sloping surfaces of the groove walls and the guide rail, thereby making it possible to allow the pointer to run stably.

In this case, the contact portions of the guide rail which are brought into contact with the sloping surfaces of the groove walls can be formed so that a section taken along the axial direction of the rotary member can have a curved surface.

Advantage of the Invention

According to the invention, the configuration of the indicator can be simplified and the pointer is allowed to run stably.

BRIEF DESCRIPTION OF THE DRAWINGS

FIGS. 6a and 6b are drawings depicting hot to install a spring member of Embodiment 1 of the invention, of which FIG. 6(a) is an exploded sectional view and FIG. 6(b) is a drawing showing a state of the spring member after it has been installed.

MODE FOR CARRYING OUT THE INVENTION

Hereinafter, the invention will be described based on embodiments thereof.

Embodiment 1

Figure 1:
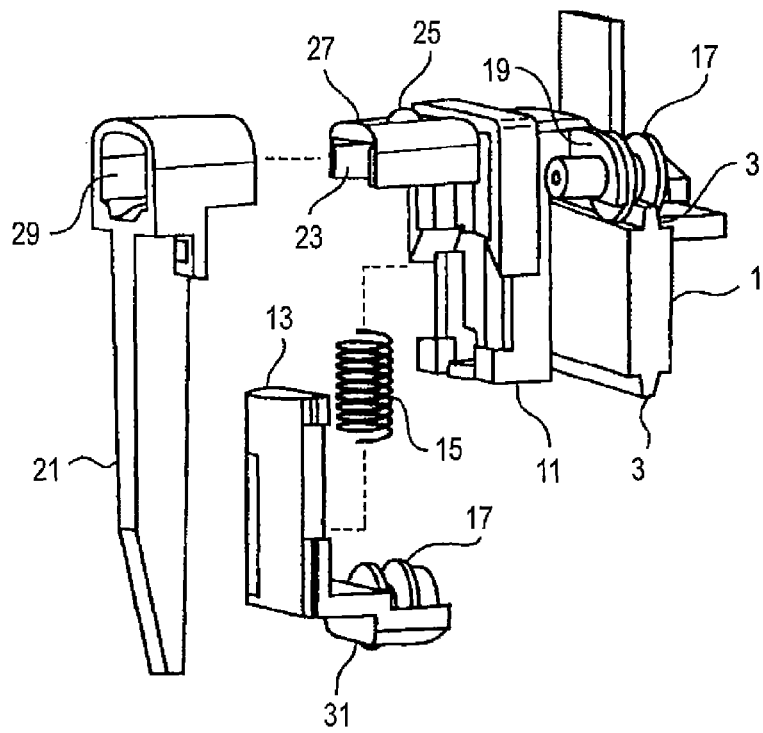
FIG. 1 is a block diagram of a moving member of Embodiment 1 of the invention.
Figure 2:
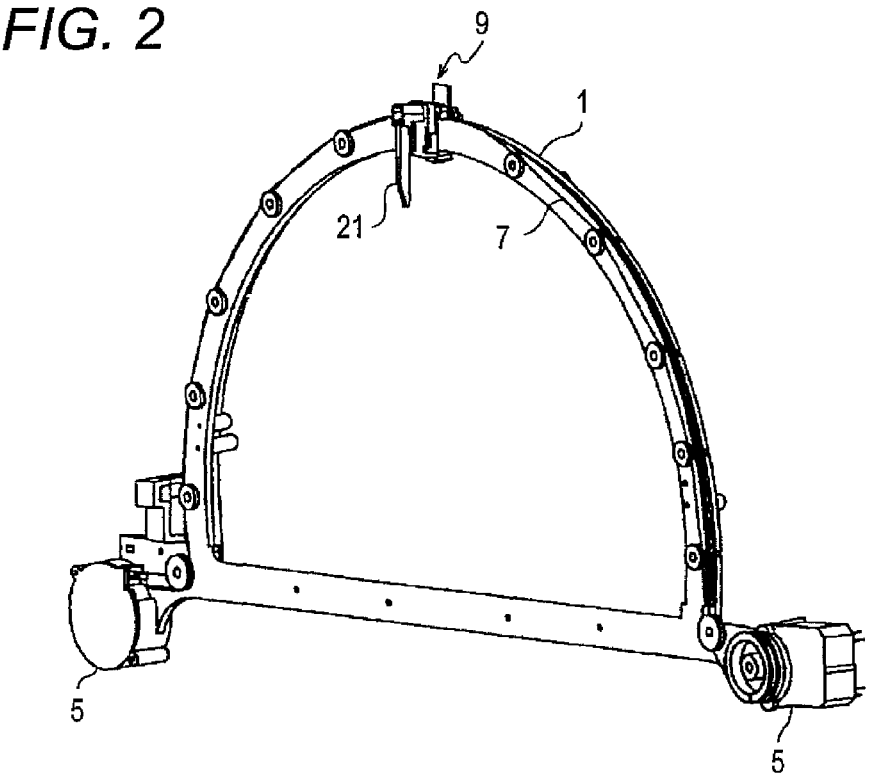
FIG. 2 is an overall view of a guide rail of Embodiment 1 of the invention.
Figure 3:
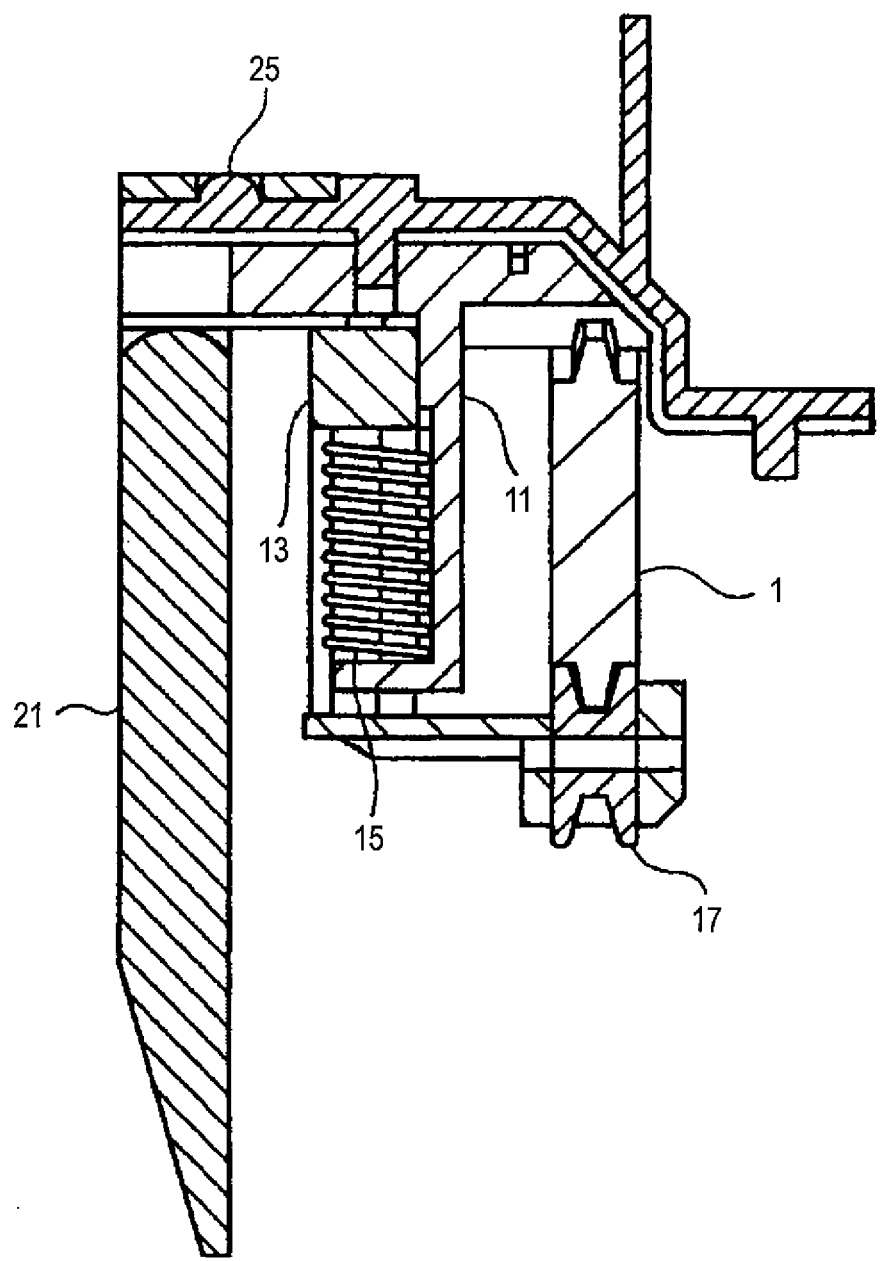
FIG. 3 shows sectional views of the guide rail and the moving member which are shown in FIG. 1.

FIG. 1 is a block diagram of a moving member provided on an indicator of Embodiment 1 of the invention, FIG. 2 is an overall view of a guide rail, and FIG. 3 is a sectional view of the moving member which holds the guide rail taken along a direction in which the guide rail extends. An indicator of this embodiment is, for example, a centerless meter which indicates speeds of a motor vehicle and has a scale which is arranged in an arc on an outer circumferential side of a face of a semicircular dial. A space is formed inside the scale where a liquid crystal indicator can be disposed, and a guide rail 1 is allowed to be disposed on a back side of the dial. The guide rail 1 is formed by causing a plate-shaped member to extend in an arc as is shown in the figure so that the direction in which the guide rail 1 extends follows a direction in which marks are arranged on the scale. A projecting portion 3 is formed on an outer circumferential surface and an inner circumferential surface of the guide rail 1, and a driving unit 5 is disposed at either end of the guide rail 1 in the extending direction thereof. The driving unit 5 of this embodiment includes a motor and a control unit, which are not shown, and is designed to impart a running force to a moving member 9 by taking up a wire 7 which is fixed to the moving member 9, whereby a pointer 21 is allowed to be moved to a predetermined mark on the scale.

Figure 4:
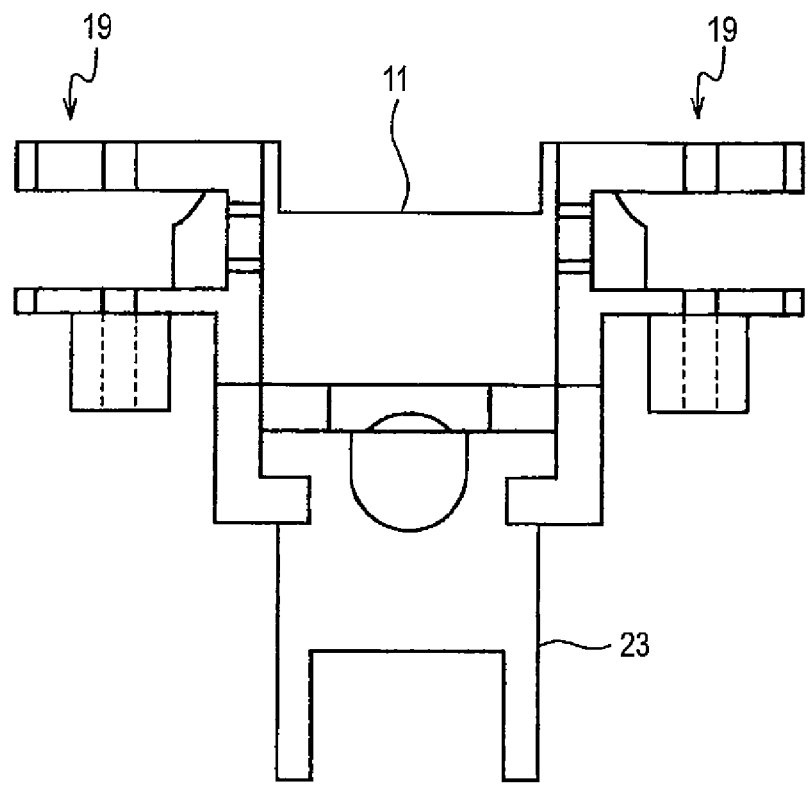
FIG. 4 is a top plan view of a first support member in FIG. 2.

The moving member 9 includes a first support member 11, a second support member 13 and a spring member 15. In this embodiment, as is shown in FIG. 4, two pulley pivotal support portions 19 are arranged in the extending direction of the guide rail 1 at an upper portion of the support member 11. The pulley pivotal support portion 19 is formed so as to pivotally support a rotational shaft of a pulley 17. A pointer installation portion 23 having a U-shaped section is formed on the support member 11, and a pointer fixing member 27 having a projecting portion 25 is provided on an upper surface of the pointer installation portion 23. This pointer installation portion 23 and the pointer fixing member 27 are inserted into an opening 29 formed in the pointer 21 so as to cause the projecting portion 25 to fit in the opening 29 to thereby fix the pointer. The installation position of the pointer 21 is not limited by the embodiment and can be modified as required.

The support member 13 is formed so as to be assembled to the support member 11, and one pulley pivotal support portion 31 is formed at a lower portion thereof. The pulley pivotal support portion 31 is formed so as to pivotally support a rotational shaft of a pulley 17. The pulley pivotal support portions 19 and the pulley pivotal support portion 31 are formed in positions which hold the guide rail 1 therebetween, and the pulley pivotal support portion 31 is disposed so as to face a substantially central position between the pulley pivotal support portions 19.

Figure 5:
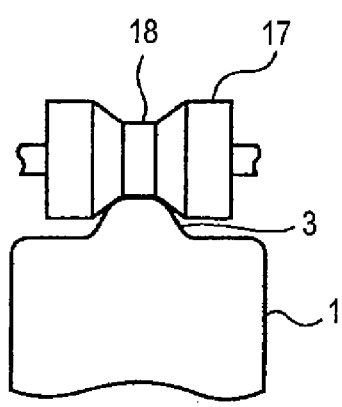
FIG. 5 is an enlarged view of a portion of FIG. 3 where the guide rail is held by pulleys therebetween.

The pulleys 17 which are supported on the support members 11, 13 are rotary members having an axial circular section and are formed, as is shown in FIG. 5, so as to have a small diameter at an axially central portion 18 and a large diameter at both axial ends thereof. The projecting portion 3 of the guide rail 1 is made to be brought into point contact with the axially central portion 18. The rotary member is not limited to the pulley 17 of this embodiment, and hence, any rotary member may be adopted, provided that it holds the guide rail 1 and supports the moving member so as to allow it to run.

Figure 6:
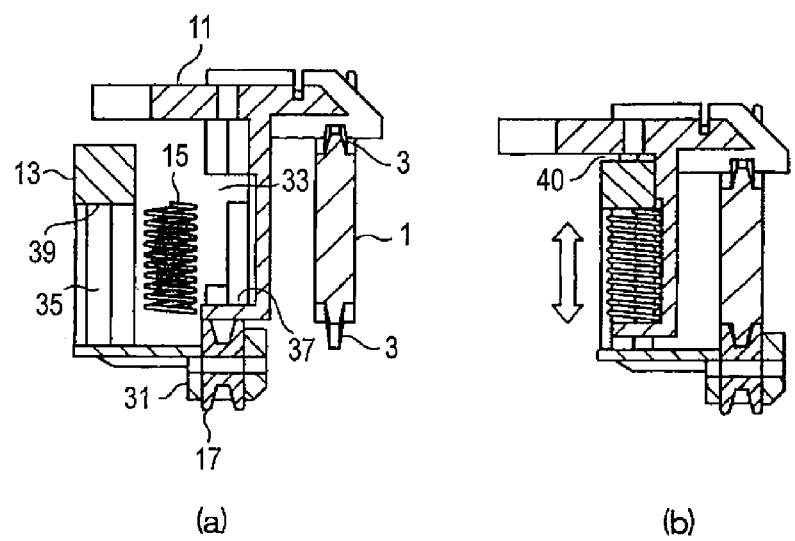

Here, a construction will be described by use of FIGS. 6(a) and 6(b) in which the guide rail 1 is held by the moving member 9. As is shown in the figures, spaces 33, 35 are formed, respectively, in the support members 11, 13 for accommodation of the spring member 15. A lower end of the spring member 15 is brought into abutment with a lower surface 37 in a plurality of surfaces which define the space 33, and an upper end of the spring member 15 is brought into abutment with an upper surface 39 in a plurality of surfaces which defines the space 35. The support members 11, 13 are assembled together with the spring member 15 brought into abutment with the lower surface 37 and the upper surface 39. The spring member 15 so accommodated press expands a space between the lower surface 37 and the upper surface 39 to thereby reduce a space in an inter-axis direction of the pulleys 17. The support members 11, 13 are assembled together so as to form a space 40 with the moving member 9 supported on the guide rail 1. The space 40 is sized so as to absorb a reduction in space in the inter-axis direction of the pulleys 17 while preventing the disassembly of the support members 11, 13. By this configuration, the two pulleys 17 which are pivotally supported on the support member 11 and the one pulley which is pivotally supported on the support member 13 are pressed against the projecting portions 13 of the guide rail 1 so as to allow the moving member 9 to be supported on the guide rail 1 so as to run thereon. The elastic member is not limited to the spring member 15, and hence, for example, a member having elasticity such as a rubber member can be used.

Figure 7:
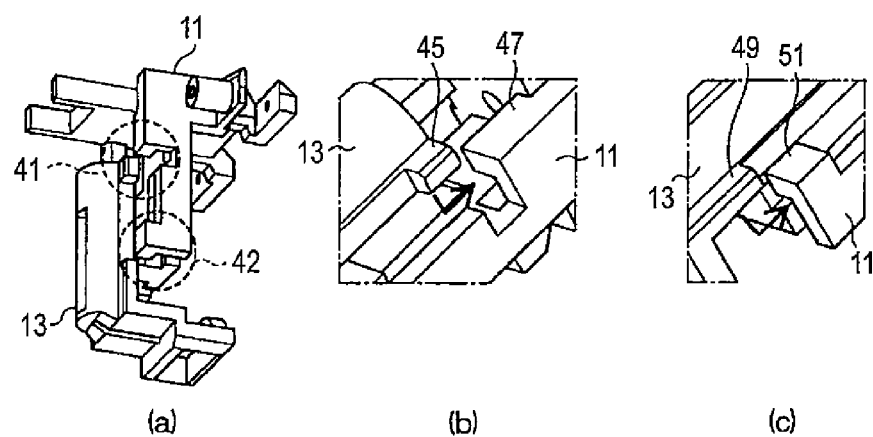
FIGS. 7(a) to 7(c) are drawings depicting how to assemble the first and second support members in FIG. 2.
Figure 8:
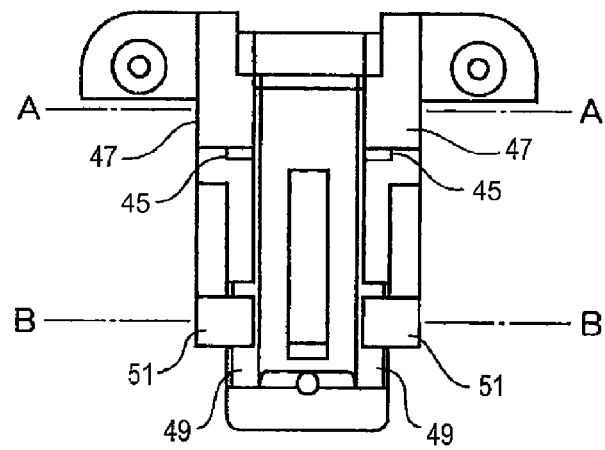
FIG. 8 is a front view of the moving member that has been assembled in FIG. 7.
Figure 9:
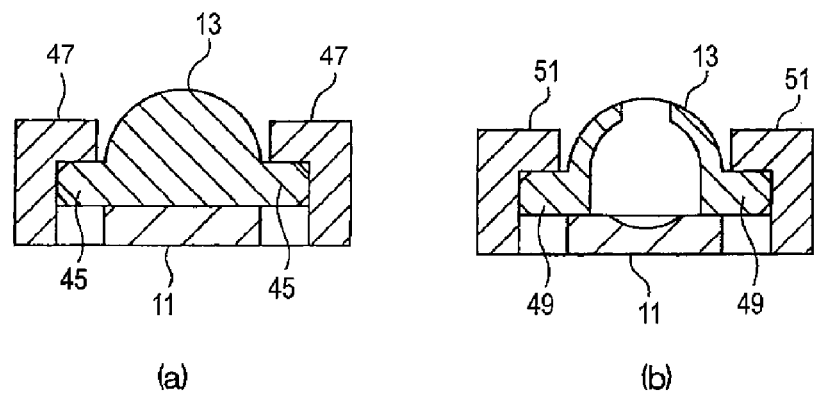
FIG. 9(a) is a sectional view taken along the line A-A in FIG. 8.
FIG. 9(b) is a sectional view taken along the line B-B in FIG. 8.

When assembled together, the support members 11, 13 are restricted from moving in the extending direction of the guide rail 1 and a direction which is at right angles to the extending direction. A portion 41 circled by a dotted line in FIG. 7(a) is a portion where a projecting portion 45 is combined with a restricting portion 47 in a direction indicated by an arrow which is shown in an enlarged fashion in FIG. 7(b). A portion 42 circled by a dotted line in FIG. 7(a) is a portion where a projecting portion 49 is combined with a restricting portion 51 in a direction indicated by an arrow which is shown in an enlarged fashion in FIG. 7(c). When viewed from the support member's 13 side, the moving member 9 is built up as shown in FIG. 8, and as is shown in FIG. 9(a), the restricting portions 47 are brought into contact with outer circumferences of the projecting portions 45 on a section taken along the line A-A in FIG. 8. As is shown in FIG. 9(b), the restricting portions 51 are brought into contact with outer circumferences of the projecting portions 49 on a section taken along the line B-B in FIG. 8. By assembling the support members 11, 13 together in the way described above, the movements of the moving member 9 in the extending direction of the guide rail 1 and the direction which is at right angles to the extending direction are restricted by the restricting portions 49, 51, respectively.

Next, the operation of this embodiment will be described. The wire 7 is taken up a predetermined amount by rotating the motor of the driving unit 5 in accordance with a measurement value of a speed of a motor vehicle. With the pulleys 17 caused to rotate, the moving member 9 runs on the guide rail 1 in accordance with a taken-up length of the wire 7 and stops at a predetermined position where the pointer 21 indicates a predetermined mark on the scale. When the moving member 9 passes over a position where the width of the guide rail 1 changes, the spring member 15 expands or contacts according to the change in width of the guide rail 1. For example, in a position where the width of the guide rail 1 becomes wider, the spring member 15 contacts, whereby an inter-axis space between the pulleys 17 on the support members 11, 13 is expanded by the guide rail 1. On the other hand, in a position where the width of the guide rail 1 is narrower, the spring member 15 expands to press the upper surface 39 towards the space 40, whereby the inter-axis space is narrowed, and the pulleys 17 press against the guide rail 1.

According to this configuration, since the support members 11, 13 can be assembled together so as to slide in the inter-axis direction of the pulleys and the pulleys 17 are allowed to hold the guide rail 1 therebetween while caused to press against the guide rail 1, the inter-axis space of the pulleys 17 can be adjusted so as to mach the dimension of the guide rail 1. As a result of this, since the variation in dimension of the guide rail due to projection tolerances can be absorbed by the spring member 15, the pointer is allowed to run stably. Further, even in the event that the inter-axis space of the pulleys 17 does not match the width of the guide rail due to the production tolerance of the support members 11, 13, since the inter-axis space can be adjusted, the looseness of the pointer produced when it runs can be reduced.

In addition, a frictional force exerted on the pulleys 17 is increased at a curved portion of the guide rail 1, making it difficult for the moving member 9 to run. However, since this frictional force can be absorbed by the spring member 15, the pointer 21 is allowed to move to a predetermined position in a stable fashion.

Additionally, since the inter-axis space of the pulleys 17 can be adjusted, the same moving member 9 can be used on guide rails 1 having different widths and shapes.

Although the installation positions of the pulleys 17 and the number thereof are not limited to those of the embodiment, in order to prevent the looseness of the moving member 9, it is preferable that two pulleys are provided on one support member, while one pulley is provided on the other support member.

In addition, the shape of the guide rail 1 is not limited to the arc shape. For example, when a scale is arranged in a straight line, a guide rail 1 can be formed in a straight line along the scale.

Figure 10:
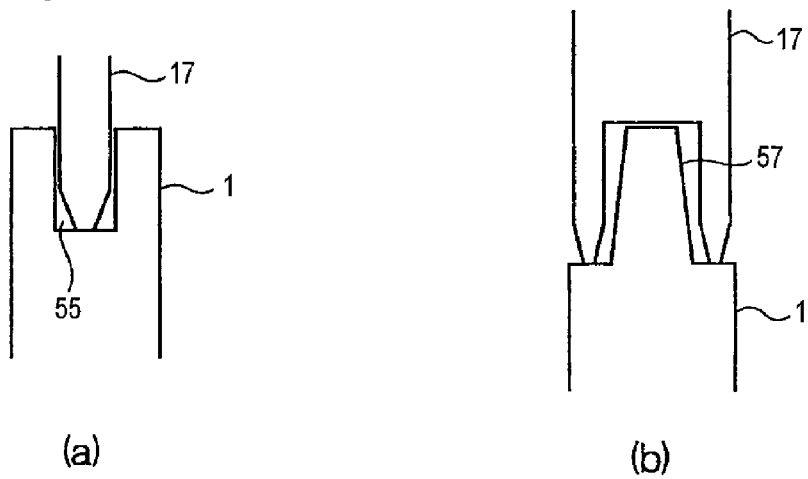
FIGS. 10(a) and 10(b) show modified examples to the pulley and the guide rail of Embodiment 1 of the invention, respectively.

Additionally, the shapes of the guide rail 1 and the pulleys 17 are not limited to those of this embodiment. For example, as is shown in FIG. 10(a), pulleys 17 can be formed into a disc shape, and a groove 55 is formed in surfaces of a guide rail 1 which is held by the pulleys 17, so that the pulleys 17 can be inserted into the grooves 55 so as to be brought into point contact with the guide rail 1 at a distal edge thereof. In addition, as is shown in FIG. 10(b), a projecting portion 57 is formed on surfaces of a guide rail 1 which is held by pulleys 17, and the projecting portion 57 can be inserted into a groove formed in the pulley 17 with a gap defined therebetween so that an edge portion of the pulley 17 can be brought into contact with a base portion of the projecting portion at two points.

Additionally, the driving unit 5 is not limited to that of this embodiment. For example, a linear motor can be used as the driving unit in which an electromagnet is installed on a moving member, magnets are aligned on a guide rail along a scale so that orientations or polarities of any adjacent magnets become opposite, so that a moving member is caused to run by switching directions in which a voltage is applied to the electromagnet.

Embodiment 2

Figure 11:
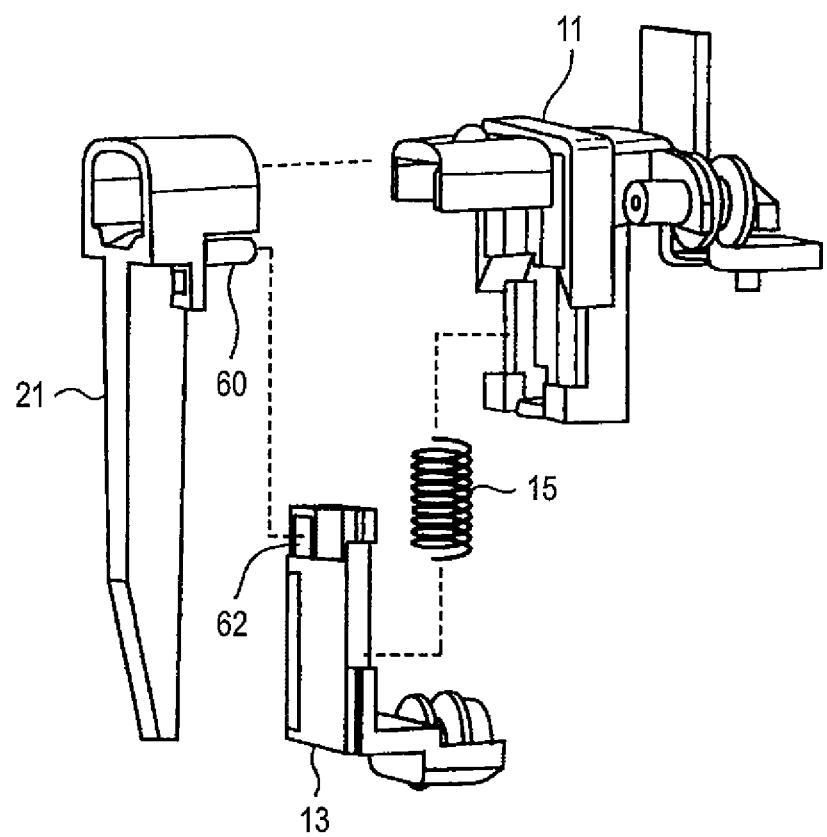
FIG. 11 is a block diagram of a moving member and a pointer of Embodiment 2 of the invention.

A moving member and a pointer which are preferable for use in Embodiment 1 are shown in FIG. 11 as Embodiment 2. As is shown in the figure, a moving member and a pointer of Embodiment 2 differ from the moving member and the pointer of Embodiment 1 in that a restricting member 60 which is formed so as to project from a pointer 21 is inserted into a groove 62 which is formed in an upper portion of a support member 13. The other configurations remain the same as those of Embodiment 1, and therefore, like reference numerals will be given to like portions to those of Embodiment 1, so as to omit the description thereof.

Figure 12:
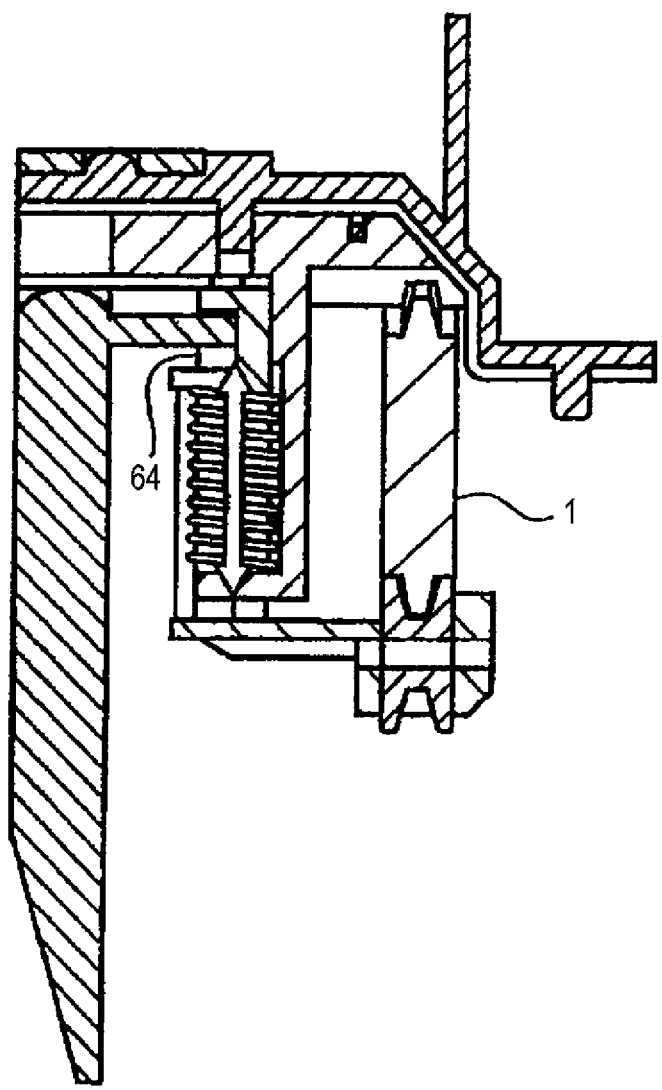
FIG. 12 is a sectional view showing a state in which a guide rail is held by the moving member in FIG. 11.
Figure 13:
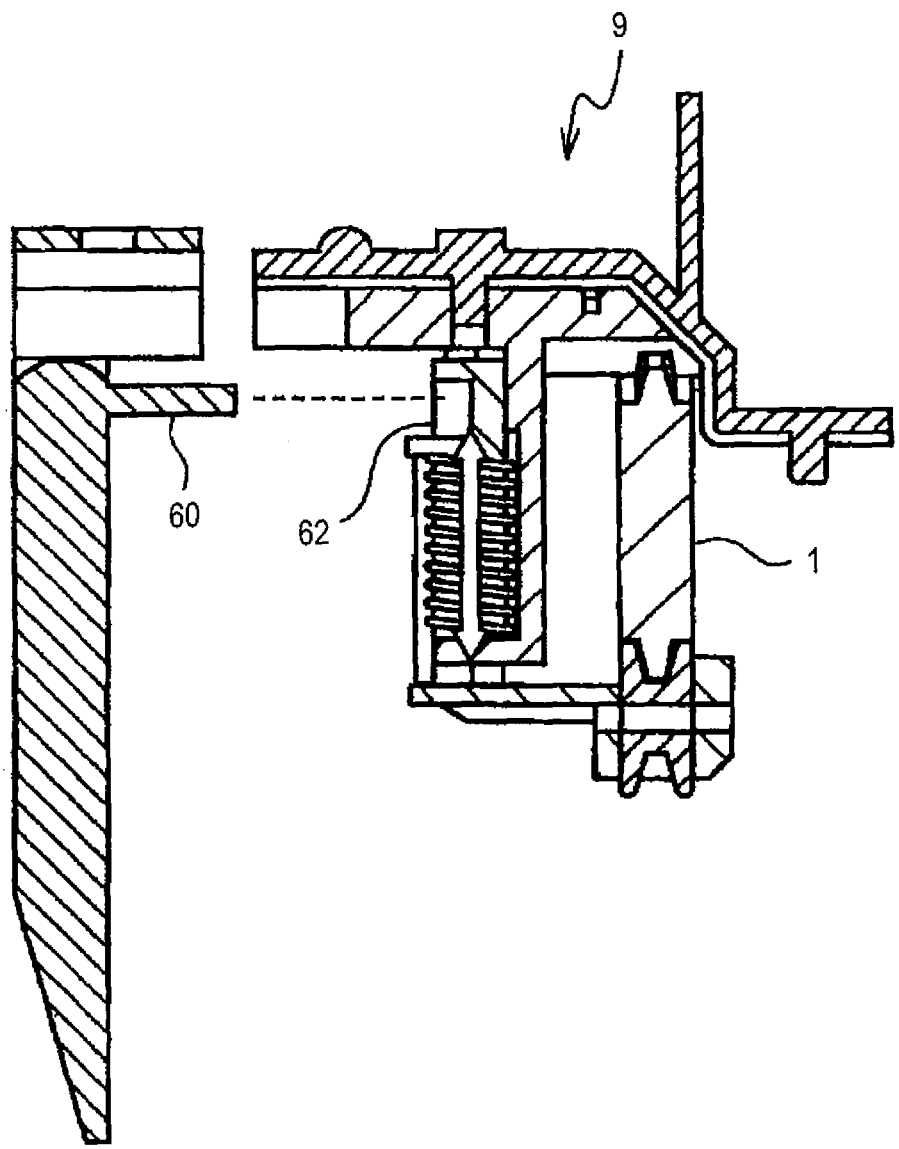
FIG. 13 is a drawing showing an inserting direction of a restricting member into a groove.

As is shown in FIG. 12, the restricting member 60 is inserted so as to be at right angles to a direction in which a spring member 15 expands. The groove 62 is formed so to have a gap 64 with the restricting member 60 inserted thereinto. When a moving member 9 and the pointer 21 are installed on a guide rail 1, as is shown in FIG. 13, after the guide rail 1 is held by the moving member 9, the pointer 21 is installed on the moving member 9.

According to this configuration, when an inter-axis space between pulleys 17 attempts to be expanded beyond a predetermined range, the restricting member 60 is brought into abutment with an inner wall of the groove 62, whereby the inter-axis space can be restricted to a space which prevents the derailment of the pulleys 17 from the guide rail 1, thereby making it possible to allow the moving member 9 to run stably. For example, when the moving member 9 runs on a curved portion of the guide rail 1, the pulleys 17, which are arranged in a straight line, do not match the shape of the guide rail 1 and hence tend to be derailed therefrom. Therefore, as this occurs, an expansion of the inter-axis space between the pulleys 17 is preferably restricted.

In addition, even in the event that the pressing of the pulleys 17 against the guide rail 1 is reduced, the pulleys 17 are made difficult to be derailed from the guide rail 1. Therefore, a frictional force between the pulleys 17 and the guide rail 1 can be reduced, which allows for use of a motor of a low torque.

The gap 64 is preferably formed so as not only to prevent the derailment of the pulleys 17 but also to absorb a variation in width of the guide rail 1 which would be produced by the production tolerance thereof.

The restricting section may only have to restrict the expansion of the inter-axis space of the pulleys 17 and hence does not have to be limited to that of Embodiment 2.

Embodiment 3

Figure 14:
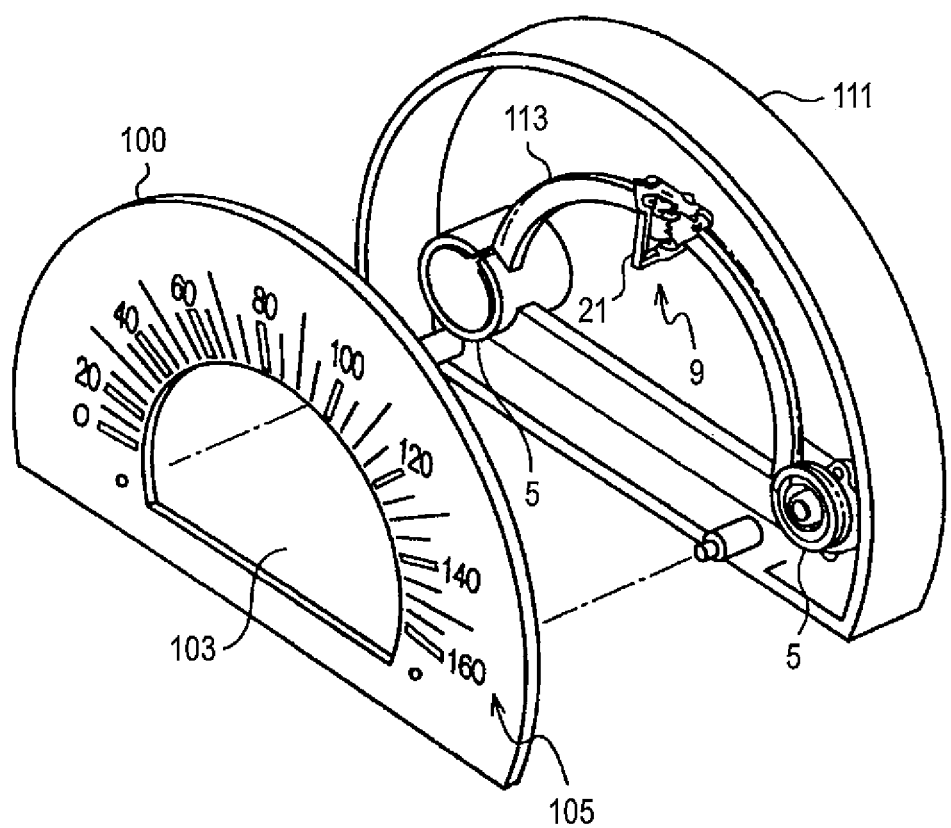
FIG. 14 is an exploded view of an indicator of Embodiment 3 of the invention.
Figure 15:
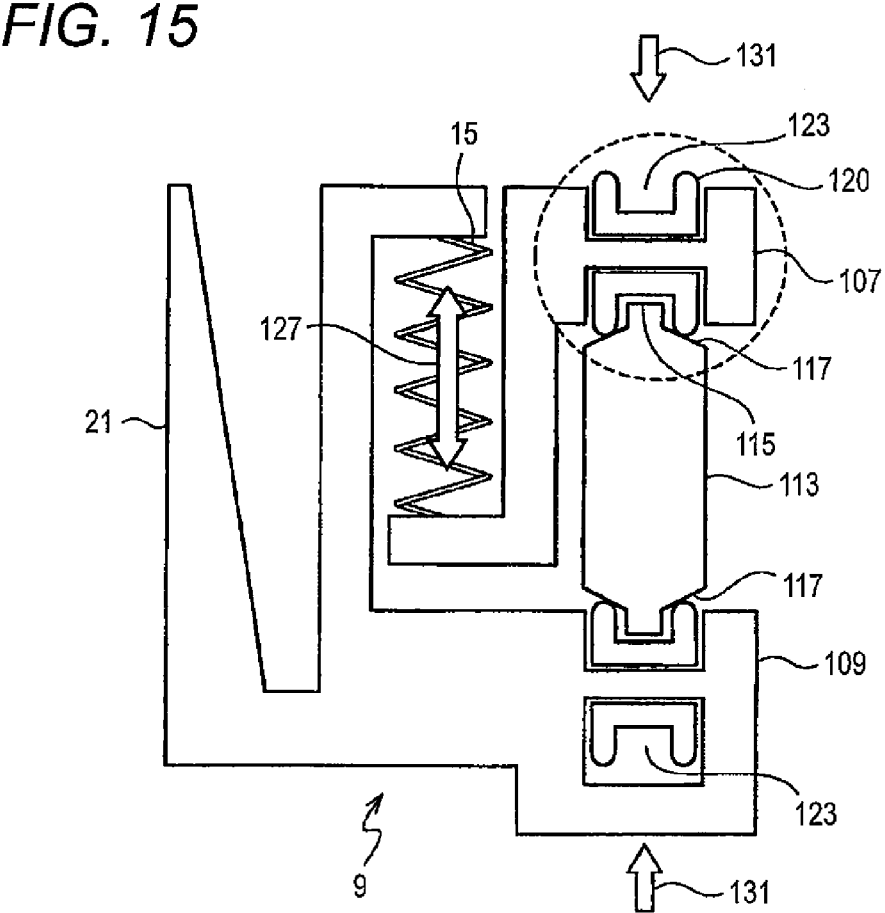
FIG. 15 is a main part of the indicator of Embodiment 3 of the invention.

An indicator of Embodiment 3 will be described by use of FIGS. 14 and 15. FIG. 14 is an exploded view of an indicator of Embodiment 3, and FIG. 15 shows a main part of Embodiment 3. As is shown in FIG. 14, Embodiment 3 is configured so that a semicircular space 103 where a liquid crystal indicator or the like can be disposed is formed inside a semicircular dial 100, which is not shown in Embodiment 1, a scale 105 is formed on the dial 100 along an outer circumference of the space 103 and a pointer 21 is positioned within the space 103 so as to indicate a mark on the scale 105. Embodiment 1 differs from Embodiment 3 in that the pointer 21 is positioned on the outer circumferential side of the dial and that the pointer 21 is oriented towards the inner circumferential side of the guide rail 1. However, the orientation of the pointer 21 is not an essential matter of the invention and hence can be selected as required. In addition, in Embodiment 3, the pointer 21 is provided on a lower support member 109 of a moving member 9. Embodiment 1 differs from Embodiment 3 in that the pointer 21 is provided at the upper portion of the moving member 9. However, the difference is caused by the difference in orientation of the pointer 21, and therefore, the support members 107, 109 of Embodiment 3 correspond to the support members 11, 13 of Embodiment 1, respectively. Consequently, the difference is not an essential matter of the invention, and hence, the description thereof will be omitted here. In addition, like reference numerals will be given to like portions to those of Embodiment 1, so as to omit the description thereof. A semicircular case 111 in FIG. 14 is a case which accommodates the guide rail on the back side of the dial, which is not shown in Embodiment 1.

Next, a characteristic configuration of Embodiment 3 will be described. A characteristic configuration of Embodiment 3 is shapes of an outer circumferential surface and an inner circumferential surface of a guide rail 113 and an outer circumferential surface of a pulley 120. As is shown in FIG. 15, formed on an inner circumferential surface and an outer circumferential surface of a guide rail 113 of Embodiment 3 are a projecting portion 115 which is formed so as to extend along a direction in which the guide rail 113 extends and sloping surfaces 117 on which the pulley 120 runs. The projecting portion 115 is formed so that a section taken along the direction of a rotational axis of the pulley 120 becomes rectangular. The sloping surfaces 117 are formed to slope downwards so as to reduce their height towards both edges of the guide rail 113 in a widthwise direction thereof. Distal edges of groove walls 133, 134 (refer to FIGS. 16(*a*) and 16(*b*)) of the pulley 120 are made to be brought into contact with the guide rail 113 on these sloping surfaces 117.

A groove 123 is formed in the outer circumferential surface of the pulley 120 to a depth which is deeper than a height of the projecting portion 115 and so as to straddle the projecting portion 115. The groove 123 is formed so as to be positioned substantially at a center of an axial position of the pulley 120.

Figure 16:
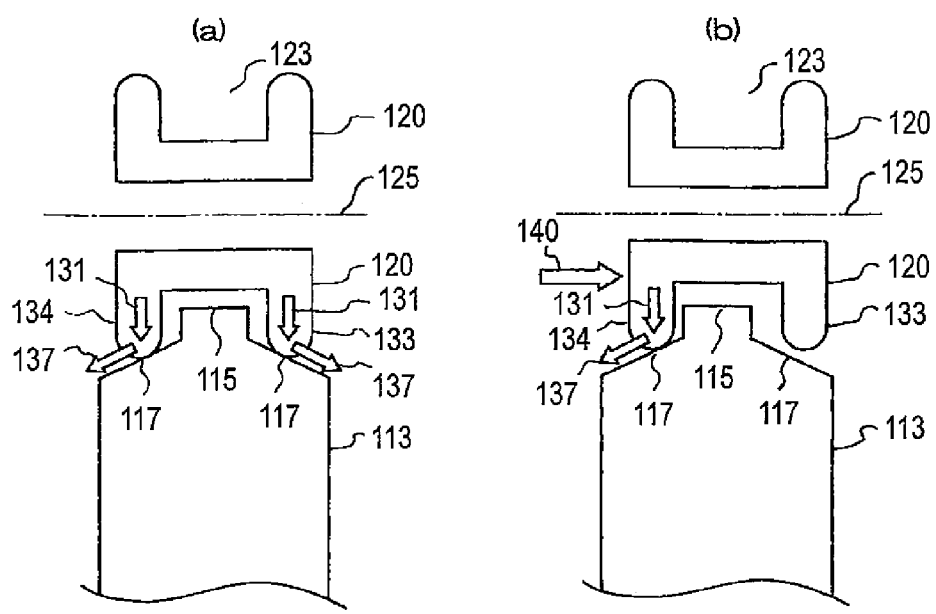
FIG. 16(a) is an enlarged view of a portion circled by a dotted line in FIG. 15.
FIG. 16(b) is a drawing showing a state in which an external force is exerted on the state shown in FIG. 16(a).

Next, a characteristic operation of Embodiment 3 will be described by use of FIGS. 16(*a*) and 16(*b*). FIG. 16(*a*) is an enlarged view of a portion circled by a dotted line in FIG. 15, and FIG. 16(*b*) is a drawing depicting a state in which an external force is exerted on the state shown in FIG. 16(*a*). Note that in FIGS. 16(*a*) and 16(*b*), the depiction of a support member 107 is omitted for the sake of facilitating the description. In addition, an alternate long and short dash line in each drawing denotes a rotational axis of the pulley 120.

Figure 17:
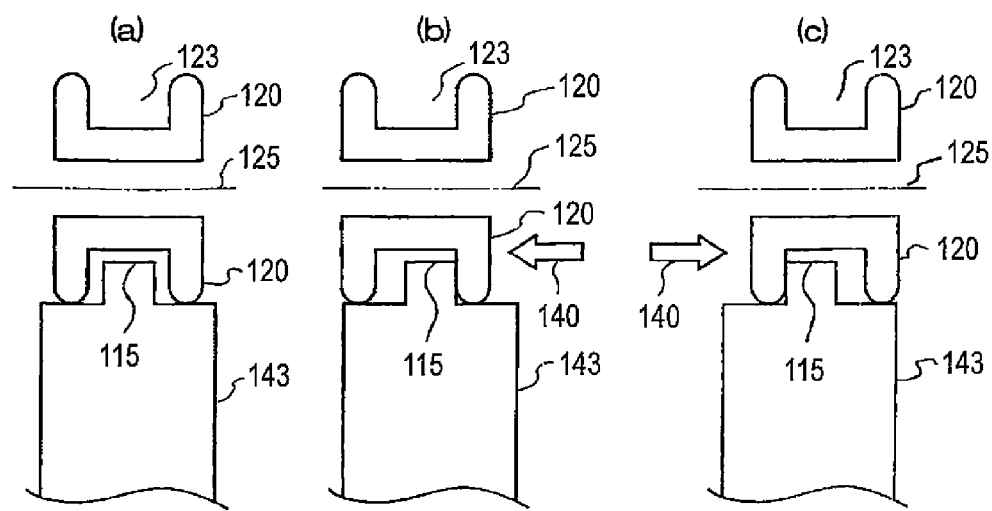
FIGS. 17(a) to 17(c) are drawings showing a state in which a rotary member is offset in a widthwise direction of a guide rail by an external force.

When an external force is axially exerted on the pulley 120, an axial position of the pulley 120 is offset in a widthwise direction of the guide rail 113, the distal edge of the groove wall 134 of the rotary member or the pulley 120 climbs up the sloping surface 117, and the distal edge of the groove wall 133 departs from the sloping surface 117. As this occurs, a component force 137 is generated so as to follow the sloping surfaces 117 of the guide rail 113 by a pressing force 131 pressing the pulley 120 against the guide rail 113 which is a spring back force 127 of a spring member 115. The axial position of the pulley 120 is returned by this component force 137. For example, as is shown in FIG. 17(*a*), when a running surface of a guide rail 143 for the pulley 120 is flat and a gap exists between a projecting portion 115 and the groove 123, in the event that an external force 140 is exerted on the pulley 120, as is shown in FIGS. 17(*b*), 17(*c*), the pulley 120 is offset in a widthwise direction of the guide rail 143, whereby the pointer 21 takes a zigzag course, an external appearance of the indicator being thereby deteriorated.

In this respect, according to this embodiment, even in the event that the external force 140 is exerted on the pulley 120 whereby the axial position of the pulley 120 is offset in the widthwise direction of the guide rail 113, the axial position of the pulley 120 is returned by the component force 137 generated by the spring back force 127 of the spring member 115, and therefore, the pointer 21 is allowed to run stably.

In addition, since the pointer 21 is allowed to run stably, the indication accuracy of the indicator can be maintained.

Additionally, since the component force 137 generated by the spring back force 127 of the spring member 115 is exerted on the sloping surfaces 117 and the pulley 120 at all times, the pulley 120 can be maintained in the position where the component force 137 so exerted is balanced, thereby making it possible to allow the pointer 21 to run stably.

In addition, in the event that resonance noise is produced by the pulley 120 being vibrated by some external force, the adoption of Embodiment 3 causes the pulley 120 to be pressed against the guide rail 113 by the component force 137, whereby the resonance noise can be suppressed.

Figure 18:
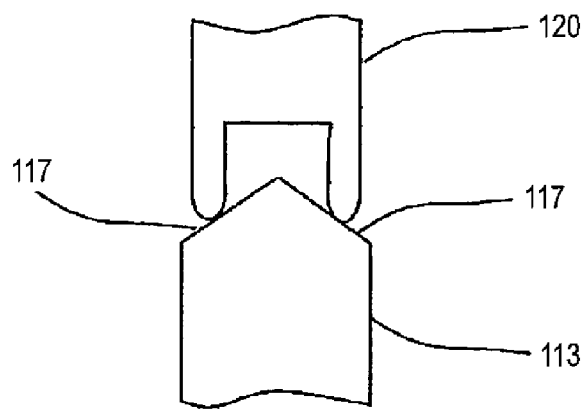
FIG. 18 is a drawing showing a modified example to Embodiment 3 of the invention.

The sectional shape of the projecting portion 115 of the guide rail 113 is not limited to the rectangular shape. For example, as is shown in FIG. 18, sloping surfaces 117 are caused to extend in a height-wise direction towards a projecting portion so as to form a triangular shape where the sloping surfaces 117 and the projecting portion are merged with each other.

Embodiment 4

Figure 19:
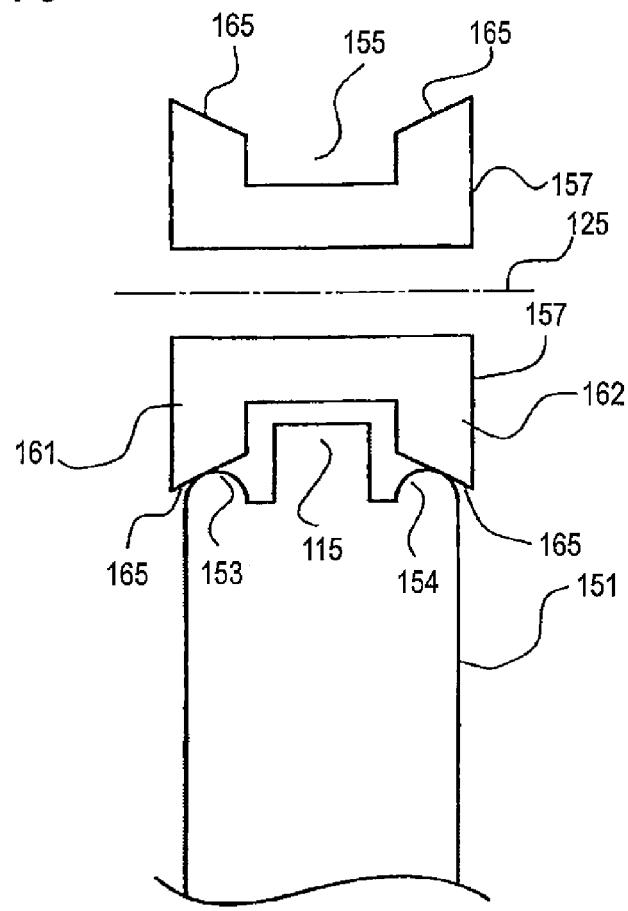
FIG. 19 is an enlarged view of a main part of Embodiment 4 of the invention.

An indicator of Embodiment 4, which is a modified example to Embodiment 3, is shown in FIG. 19. FIG. 19 is an enlarged view of a main part of Embodiment 4. Embodiment 4 differs from Embodiment 3 in shapes of an outer circumferential surface and an inner circumferential surface of a guide rail and an outer circumferential surface of a pulley. The other configurations remain the same as those of Embodiment 3, and therefore, like reference numerals will be given to like portions to those of Embodiment 3, so as to omit the description thereof.

A projecting portion 115 and projecting portions 153, 154 are formed on an inner circumferential surface and an outer circumferential surface of a guide rail 151, the projecting portions 153, 154 being formed at both edge portions of the guide rail 151 in a widthwise direction thereof so as to extend along the projecting portion 115. Namely, three projecting portions are formed on both the inner circumferential surface and the outer circumferential surface of the guide rail 151. A section of the projecting portions 153, 154 taken along a direction which is at right angles to the extending direction of the guide rail 151 has a substantially semicircular shape.

A pulley 157 is a cylindrical rotary member and a groove 155 is formed in an outer circumferential surface thereof so as to straddle the projecting portion 115. The groove 155 is formed so as to be positioned substantially at an axial center of the pulley 157. A sloping surface 165 is formed on inner surfaces of respective groove walls 161, 162 of the groove 155 so as to slope downwards to flare out towards the guide rail 151. The sloping surfaces 165 of the pulley 157 come into contact with apex portions of the projecting portions 153, 154 of the guide rail 151 so as to run on the projecting portions 153, 154.

According to this configuration, when an axial position of the pulley 157 is offset in a widthwise direction of the guide rail 151, the pulley 157 is lifted upwards along the sloping surface 165 of one of the groove walls of the pulley 157, whereas the sloping surface 165 of the other groove wall departs from the running surface of the guide rail 151. As a result, the axial position of the pulley 157 is returned by a component force of a spring back force of a spring member 15 which is generated at a contact portion between the sloping surface 165 of the groove wall of the pulley 157 and the guide rail 151, whereby a pointer 21 is allowed to run stably.

Figure 20:
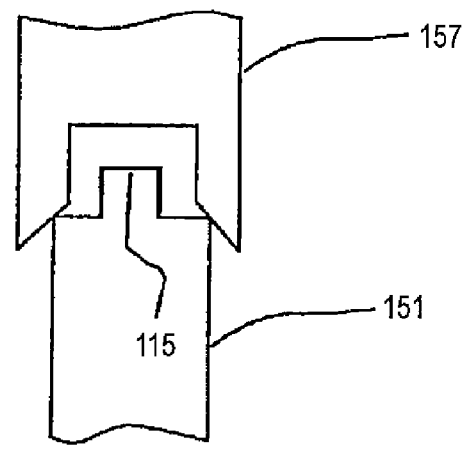
FIG. 20 is a drawing showing a modified example to Embodiment 4 of the invention.

The guide rail 151 is not limited to that of Embodiment 4. For example, as is shown in FIG. 20, the sloping surfaces 165 of the pulley 157 are brought into contact with corner portions of the running surface of the guide rail 151 without forming the projecting portions 153, 154 on the guide rail 151 so as to allow the pulley 157 to run.

DESCRIPTION OF REFERENCE NUMERALS

1 guide rail; 5 driving unit; 11 support member; 13 support member; 15 spring member; 17 pulley; 21 pointer; 60 restricting member; 113 guide rail; 115 projecting portion; 117 sloping surface; 120 pulley; 123 groove; 133, 134 groove wall; 151 guide rail; 157 pulley; 155 groove; 161, 162 groove wall; 165 sloping surface.

The invention claimed is:

1. An indicator, having:
   a guide rail formed along a scale formed on a dial;
   a moving member supported on the guide rail so as to run; and
   a pointer installed on the moving member to indicate a mark on the scale and a driving device for imparting a driving force to the moving member;
   wherein the moving member comprises a first support member for pivotally supporting a plurality of rotary members which are arranged along the guide rail and a second support member for pivotally supporting at least one rotary member;
   the plurality of rotary members pivotally supported on the first support member and the rotary member pivotally supported on the second support member are made to hold the guide rail therebetween and the first support member and the second support member are assembled to each other so as to slide in an inter-axis direction of the plurality of rotary members which are pivotally supported on the first support member and the rotary member which is pivotally supported on the second support member; and
   the indicator has an elastic member for biasing the first support member and the second support member in a direction to reduce an inter-axis space therebetween.

2. The indicator as set forth in claim 1, wherein the rotary members each have a groove in a surface thereof which holds the guide rail into which the guide rail is inserted.

3. The indicator as set forth in claim 1, wherein the guide rail has a groove in portions thereof which are held by the rotary members into which edge portions of the rotary members are inserted.

4. The indicator as set forth in claim 1, comprising:
   a restricting section for restricting an expansion of the inter-axis space by the elastic member in such a state that the first support member and the second support member are assembled on to the guide rail.

5. The indicator as set forth in claim 1, wherein the guide rail has a projecting portion on running surfaces thereof on which the rotary members run so as to extend in a running direction of the rotary members, in that the rotary members are each formed to have a groove formed in an outer circumferential surface thereof to a depth which is deeper than a height of the projecting portion and so as to straddle the projecting portion, and in that the running surfaces each have sloping surfaces which are formed so as to slope downwards to reduce their height towards edges of the guide rail in the widthwise direction thereof so that the rotary members are each brought into contact with the guide rail on the sloping surfaces.

6. The indicator as set forth in claim 1, wherein the guide rail has a projecting portion on running surfaces thereof on which the rotary members run so as to extend in a running direction of the rotary members;
   the rotary members are each formed to have a groove formed in an outer circumferential surface thereof so as to straddle the projecting portion, and in that inner surfaces of both groove walls of the groove formed in each of the rotary members are formed into sloping surfaces which slope downwards to flare out towards the guide rail so that the rotary members are each brought into contact with the guide rail on the sloping surfaces.

* * * * *